(No Model.)

J. RIGBY.
CAR WHEEL.

No. 539,594. Patented May 21, 1895.

WITNESSES
O. R. Baenziger
M. A. Martin

INVENTOR
James Rigby
By his Attorney
Newell S. Wright

UNITED STATES PATENT OFFICE.

JAMES RIGBY, OF DETROIT, MICHIGAN, ASSIGNOR TO HARRY L. SCHELLENBERG, OF SAME PLACE.

CAR-WHEEL.

SPECIFICATION forming part of Letters Patent No. 539,594, dated May 21, 1895.

Application filed July 25, 1894. Serial No. 518,535. (No model.)

*To all whom it may concern:*

Be it known that I, JAMES RIGBY, a citizen of the United States, residing at Detroit, county of Wayne, State of Michigan, have invented certain a new and useful Improvement in Car-Wheels; and I declare the following to be a full, clear, and exact description of the invention, such as will enable others skilled in the art to which it appertains to make and use the same, reference being had to the accompanying drawings, which form a part of this specification.

My invention has for its object a car wheel of novel construction, embracing a novel locking device to hold the tire in place, the wheel thus being of superior utility, economy and durability, and my invention consists of the construction, combination and arrangement of devices hereinafter described and claimed, and illustrated in the accompanying drawings, in which—

Figure 1:
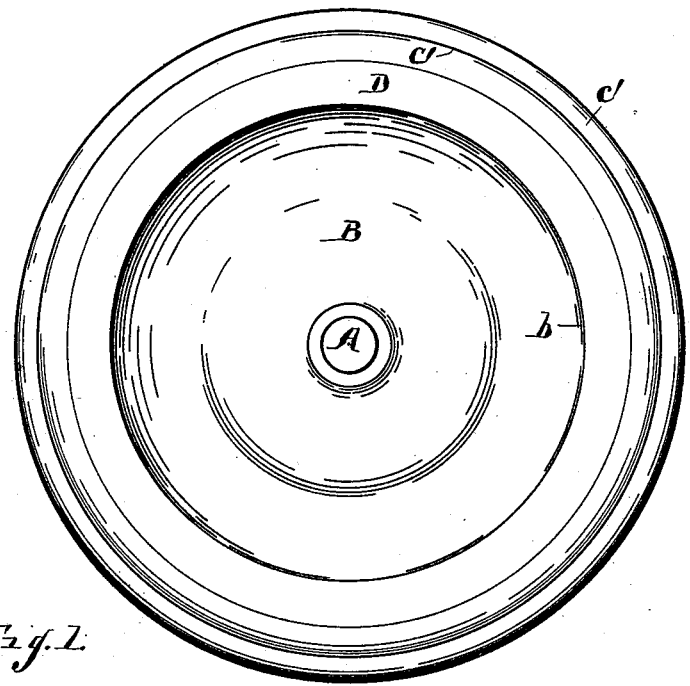
Figures 2, 3:
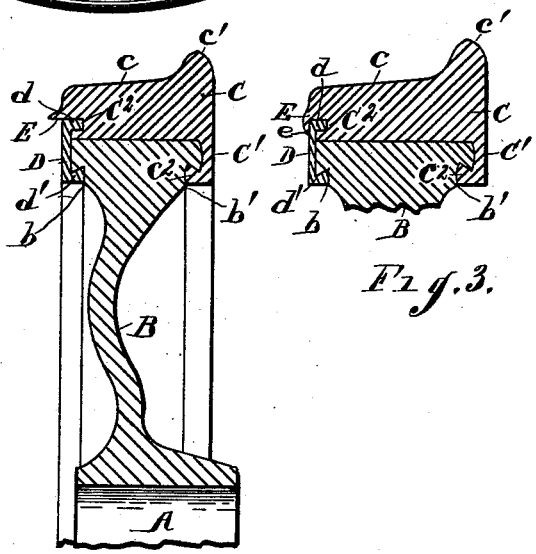

Figure 1 is a side elevation of a car-wheel. Fig. 2 is a radial section of the same. Fig. 3 is a detail view showing the engagement of the flange E upon the locking device.

It is well understood that as car wheels have heretofore been constructed, great numbers of them have been found defective, that the tire is liable to break and become disengaged from the web or work loose therefrom in use, which has been a frequent cause of railroad accidents, and that such wheels have not possessed the desired and requisite qualities of firmness and endurance essential to safety and economy.

My invention is designed to overcome the difficulties and imperfections heretofore common, and to provide a car wheel so formed that the tire will not be liable to become loose or disengaged from the web of the wheel.

The purpose of my invention is thus to make a car wheel that will insure greater safety, strength, and durability, and which to a certain extent will be elastic.

I carry out my invention as follows:

A represents the hub of the wheel, and B the body or web which I prefer to construct of ogee form in radial section, as shown more particularly in Fig. 2. This ogee form will obviously give to the web great strength and endurance, and enable the wheel to be made lighter if desired. The ogee shape of the body or web will, obviously, give to the wheel a certain amount of elasticity. The opposite sides or lateral faces of the body or web toward the periphery are constructed with annular grooves $b$ and $b'$, the upper edges of said grooves being preferably of dovetail form, as shown in Fig. 2. The outer side of the web and of the tire, or that side opposite the outstanding flange of the tire is known as the face side of the wheel.

C denotes the tire, preferably a steel tire, formed on its periphery with the usual tread $c$ and the usual lip or flange $c'$. The inner portion of the tire at one side thereof is constructed with an inwardly projecting annular flange $C'$ having at its inner edge, and at essentially a right angle thereto, a flange $c^2$ to engage in the groove $b'$ of the web. The flange $C'$ extends over the adjacent lateral face of the body or web between the groove $b'$ and the periphery of the web, as shown in Fig. 2. The tire on its lateral face opposite the flange $C'$ is constructed with an annular recess or groove, as at $C^2$.

D denotes an annular locking ring provided at its outer edge with an inwardly turned flange $d$ to enter into the recess $C^2$ of the tire C. At its opposite or inner edge, the locking ring D is provided with an inwardly turned flange $d'$ to enter the groove or recess $b$ of the web or body B.

The flange $c^2$ of the tire, and the flange $d'$ of the locking device preferably have each a dovetailed engagement in the respective grooves or recesses $b\ b'$ of the web.

My invention contemplates also, welding the upper portion of the locking ring and the tire together when the latter is in place. To this end the tire is preferably provided with a normally outstanding flange E just above the groove $C^2$ as indicated in Fig. 2, and which when the locking ring is in place is bent over the adjacent portion or outer face of the locking device D, as indicated at $e$ Fig. 3, and welded thereupon to securely hold the locking ring in engagement with the tire.

The flange $d$ of the locking ring preferably enters straight or at right angles to the body of the locking ring into the corresponding groove $C^2$ of the tire.

In the construction of the wheel, the locking ring is first engaged with the web of the wheel by entering its flange $d'$ in the groove $b$ of the web. The tire being expanded, the flange $c^2$ is entered into the groove $b'$ of the web, and the groove $C^2$ engaged with the flange $d$ of the locking ring. The tire is then shrunk into place in the usual manner. The flange E is then bent over against the locking ring and welded thereupon. It will be apparent that the dovetailed engagement of the inner flange of the locking ring with the web, and the welding of the upper portion of said ring with the tire will effectually prevent and overcome any possible liability of the tire working loose or working off, inasmuch as in no possible way can the tire be removed except by cutting off the locking ring. It will be seen that the engagement of the locking ring with the body or web of the wheel and with the tire, is such as to effectually prevent any elongation of the tire by the pressure upon or pounding of the wheel when the tire has worn thin, for the flange $d$ of the locking ring engaged with the tire, and the flange $c^2$ of the tire engaging the body of the wheel, will overcome any and all liability of such elongation. So, too, should the tire break it cannot become disengaged from the web unless the locking ring should also break.

I do not limit myself solely to any particular method or manner of welding the locking ring D with the tire, as my invention contemplates any suitable method of such engagement as coming within its scope.

Hitherto it has been noticeable that wheels with the greatest number of parts have had the greatest number of defects; but in my wheel the number of parts are obviously reduced to a minimum. I employ no bolts, screws, or rivets. The locking ring when welded into place, virtually forms a part of the tire, so that in the finished wheel I have in reality only two parts which cannot be disengaged from any use or any accident whatever.

It will be observed that the upper faces of the grooves of the web project downward and outward in dovetail connection with the correspondingly shaped flanges of the locking ring and tire, making it impossible for the tire and locking ring to work outward at the point of these dovetailed connections when the tire is shrunk into place, and the locking ring is welded into position. At the same time it is obviously impossible for the tire and locking device to work loose in the opposite direction. This construction thus makes a completed car-wheel of the most absolute durability and safety.

By making the wheel as above described, it can be used longer than it could if the locking key ring were located upon the inner side of the wheel, or the side on which the outside flange is located, as the wear on the tire is mostly upon the flange and the portion of the tread adjacent thereto. As the tread wears down toward the recess for the ring, the strength of the wheel is decreased to such an extent that the pressure against the flange soon breaks it off and thereby renders the wheel useless; but by placing the groove for the ring upon the opposite or face side of the wheel, the flange side of the tire retains its strength until the tire is almost entirely worn out, and at the same time, the tread of the tire can be kept true by turning off the unworn portion over the locking ring recess, even until it has been cut substantially into the recess itself.

Still another advantage arises from the above construction by making the face of the web at that side of the wheel extend out substantially parallel with the surface of the tire, thereby retaining the entire strength of the rim of the body of the wheel and making a much stronger wheel than if a portion of the rim had to be cut away for the overlapping portion of the tire; and by making the flange B continuous and welding it down upon the locking ring D it is evident that a much stronger construction can be secured than can be had where the flange is not continuous.

It will be seen that when the locking ring is welded into place in the completed wheel, its character and structure become very materially changed from that possessed prior to its being welded to the tire, inasmuch as when the welding process is completed, the locking ring in fact, then becomes an integral part of the tire itself, just as much as if integrally formed with the tire at the outset; but in that case, of course, the tire with this locking provision could not be applied to the web. It becomes necessary therefore, to form the locking ring independently of the tire in order to apply it, and when applied to integrally unite it by welding to the tire.

What I claim as my invention is—

1. A car wheel constructed with a body or web grooved on its lateral faces toward its periphery, a tire formed with a groove $C^2$ on one side thereof, and with flanges $C'$ and $c^2$ on the opposite side thereof to engage one of the grooves of the web, and a continuous annular locking device or ring D provided with two flanges projecting from its edges, one of said flanges engaging with the other groove of the web and the other flange engaging with the groove of the tire, said tire being provided with a continuous annular flange E bent over and welded upon the upper edge of said locking device, substantially as set forth.

2. A car wheel constructed with a body or web having annular grooves $b\ b'$ on its lateral faces toward its periphery, a tire formed with a groove $C^2$ projecting laterally into one of the lateral faces of the tire at right angles to the radius of the wheel and with a flange on the opposite side thereof engaged in one of said grooves of the web, and a continuous annular locking ring D provided with laterally projecting flanges $d\ d'$ at the outer and inner edges thereof, said flanges of the locking ring engaged in the groove $C^2$ of the tire and in the adjacent groove of the web, the inner flange of the locking ring having a dovetailed engagement with the corresponding groove of the web, and the outer portion of the locking ring being welded to the tire whereby the ring becomes an integral part of the tire, substantially as set forth.

3. A car wheel constructed with a body or web having annular grooves $b\ b'$ on its lateral faces toward its periphery, a tire formed with a groove $C^2$ projecting laterally into one of the lateral faces of the tire at right angles to the radius of the wheel, and with a flange on the opposite side thereof engaged in one of said grooves of the web, and a continuous annular locking ring D provided with laterally projecting flanges $d\ d'$ at the outer and inner edges thereof, said flanges of the locking ring engaged in the groove $C^2$ of the tire and in the adjacent groove of the web, said tire also provided with an integral annular flange E normally projecting laterally outward from the body of the tire above and parallel with the groove $C^2$, said flange E bent over and welded down directly upon the adjacent face of said locking ring when the locking ring is in place whereby the ring becomes an integral part of the tire, substantially as set forth.

In testimony whereof I sign this specification in the presence of two witnesses.

JAMES RIGBY.

Witnesses:
N. S. WRIGHT,
M. A. MARTIN.